United States Patent Office 3,294,580
Patented Dec. 27, 1966

3,294,580
PROCESS FOR PRODUCING NON-WOVEN FABRIC WITH AQUEOUS COPOLYMER EMULSION, AND THE BONDED FABRIC
Günter Kolb and Karl-Arnold Weber, Cologne-Stammheim, and Bruno Zorn, Cologne-Flittard, Germany, assignors to Farbenfabriken Bayer Aktiengesellschaft, Leverkusen, Germany, a German corporation
No Drawing. Filed Sept. 29, 1964, Ser. No. 400,223
Claims priority, application Germany, Oct. 31, 1963, F 41,155
12 Claims. (Cl. 117—140)

This invention relates to a process for the production of non-woven fabrics using aqueous copolymer emulsions.

It is already known to use aqueous copolymer emulsions which provide insoluble products under the influence of elevated temperatures and acidic agents as binders for non-woven fabrics. Such copolymer emulsions can only be used without damage to the substrate if the substrate itself comprises materials which are resistant to acid and temperature.

It has now been found that non-woven fabrics which conform to all practical requirements can be produced by using aqueous emulsions of copolymers containing the radical —CO—NH—CH$_2$—NH—COOR$_2$ several times in the polymer molecule as binders for non-woven fabrics, since polymers of this type can satisfactorily be transformed into insoluble products at temperatures below 100° C., independent of the pH value of the medium.

It has, more particularly, been found that copolymers which are suitable for the binding of the non-woven fabric are those which are obtained by polymerisation of:

(a) 0.1 to 50% by weight, based on total monomers, of a compound of the Formula I

I        CH$_2$=C—CO—NH—CH$_2$—NH—COOR$_2$
              |
              R$_1$ wherein R$_1$ and R$_2$ represent alkyl, cycloalkyl, aralkyl or aryl groups, preferably alkyl radicals having 1 to 6 carbon atoms, cycloalkyl radicals having 5 to 7 carbon atoms, phenylalkyl radicals having 1 to 3 carbon atoms in the alkyl part, phenyl and naphthyl radicals, (b) At least one monomer with an elasticising action which is a conjugated 1,3-diolefine with 4 to 6 carbon atoms, an ester of acrylic acid with 1 to 20 carbon atoms in the alcohol moiety or an ester of methacrylic acid with 4 to 20 carbon atoms in the alcohol moiety, and (c) Optionally other monomers which are capable of radical copolymerisation.

Compounds of the general Formula I, which serve for the formation of the copolymers to be used according to the invention, include, for example, the methyl, ethyl and butyl esters of acrylamidomethylene carbamic acid and the methyl and phenyl esters of methacrylamidomethylene carbamic acid.

Of preferred importance in this connection are the esters of amidomethylene carbamic acid with a saturated, monovalent, aliphatic alcohol with 1 to 4 carbon atoms. According to a preferred embodiment of the present invention, the copolymers used contain the monomers according to Formula I in quantities from 1 to 15% by weight, based on total monomer, incorporated by polymerisation.

The following are examples of the aliphatic conjugated diolefines with 4 to 6 carbon atoms that can be used as comonomer component with an elasticising action: 1,3-butadiene, isoprene, 2-methyl-1,3-butadiene and 2-chlorobutadiene. If acrylic or methacrylic acid esters are used, they are advantageously the esters of monovalent, aliphatic, saturated alcohols, for example the methyl, ethyl, butyl, isobutyl, dodecyl and octadecyl esters of acrylic acid, or the butyl, 2-ethylhexyl, dodecyl and octadecyl esters of methacrylic acid.

These monomer components with an elasticising action are advantageously used in quantities from 20 to 99% by weight, based on total monomers.

To form the copolymer emulsions to be used according to the invention, it is sometimes desirable to employ further monomers containing double bonds and capable of radical copolymerisation. Examples of suitable further monomers include esters of methacrylic acid with alcohols containing 1 to 3 carbon atoms, such vinyl esters as vinyl acetate, vinyl propionate or vinyl benzoate, such unsaturated hydrocarbons as ethylene and propylene, such unsaturated halogenated hydrocarbons as vinyl chloride or dichlorethene, such aromatic vinyl compounds as styrene and α-methyl styrene, acrylic acid, methacrylic acid, as well as their derivatives such as acrylic or methacrylic acid amides, acrylonitrile or methacrylonitrile, 2-hydroxyethyl methacrylate, 2-aminoethyl methacrylate hydrochloride and 2-vinyl pyridine.

Styrene, acrylonitrile, methacrylamide, vinyl acetate and methyl methacrylate are preferably employed as third comonomer. These monomers are used in quantities from 0 to 79% by weight based on total monomer.

The copolymer emulsions can be prepared by polymerizing the monomers in substance, in solution or in emulsion by means of conventional polymerisation catalysts which form free radicals. Polymerisation in aqueous emulsion at pH values below 7 and temperatures not exceeding 50° C. has proved satisfactory. It is readily possible (and here also is included under the term of copolymerisation) to carry out the production of the polymers as a graft or block copolymerisation, in which instance one or more of the monomers is initially polymerised and then one or more of the remaining monomers is completely polymerised with the prepolymer.

In the present process, the expression "non-woven fabrics" is intended to cover all conventional fibre fleeces, for example long-piled fabrics produced by the wet process on paper-making machines, or cross-laid fleeces which are produced on cards or by the air lay system, tangled fibre fleeces and felts, made both from wool and from synthetic fibres.

Fibres used for the formation of the non-woven fabrics include natural cellulose fibres, such as cotton, jute, ramies and linen, regenerated cellulose such as rayon, cuprammonium cellulose fibres and viscose cellulose, fibres of cellulose esters, such as cellulose acetate, natural fibres such as silk and wool, regenerated fibres of protein decomposition products, fibres of polyesters such as polyethylene glycol terephthalate, fibres based on condensation products of saturated, alphatic diamines and dicarboxylic acids, polymerisation products of cyclic lactams, vinyl resin fibres, as for example of a copolymer of vinyl chloride and vinyl acetate, of polypropylene, of acrylonitrile polymers containing a predominant proportion of acrylonitrile, of polyurethanes, of polyvinyl alcohols and of inorganic fibres, for example glass, asbestos or metal fibres. It is obviously possible for any desired mixtures of the afore-mentioned types of fibres to be used.

Any auxiliary agents which are conventional in the textile and paper industries can be added to the aqueous copolymer emulsions according to the process of the invention, for example soluble and insoluble dyestuffs, inorganic and organic pigments, optical brighteners, suface-active substances such as emulsifiers, wetting agents and foaming agents, thickening agents (alginates, cellulose or starch ethers or esters), fillers such as kaolin or bentonite, stabilisers such as casein, polyvinyl alcohol or ammonium salts of polyacrylic acid, products for improvement purposes, such as reactant resins (ureaformaldehyde resin), aminoplast and phenoplast precondensates, hardenable epoxy condensates, insecticides, fungicides, bactericides and, optionally, age resisters and adhesion promoters. According to the present invention, the binder is applied to the fibre pile in conventional manner by immersion, impression, spraying, coating or similar methods and dried by conventional methods, advantageously at temperatures from 50 to 85° C. The dried non-woven fabric, after a normal drying process, is immediately ready for use without any after-condensation at temperatures exceeding 100° C. being necessary, i.e. the non-woven fabric is insoluble in organic solvents, independent of the pH value of the binder solution or of the impregnated non-woven fabric. A thermal after-treatment at high temperatures i.e. at 85 to about 150° C. may be carried out, but the particular advantage of the present invention is just that such high temperatures are not necessary, though this after-treatment may sometimes further improve the product. The after-treatment may also be carried out by applying heat (85 to 150° C.) and pressure (up to 50 atmospheres) simultaneously.

The process according to the invention is particularly suitable for the production of non-woven fabrics which are sensitive to temperature or acid, e.g. fabrics of wool, polyethylene fibres, acetate fibres, polyvinyl chloride fibres, natural and synthetic rubber fibres or polyurethane fibres. Furthermore, this new process makes it possible to use products which can only be applied in alkaline medium, in a single bath process with the binder emulsion, e.g. vat dyestuffs or reactive dyestuffs on cellulose or cresolformaldehyde condensation products. It has surprisingly been found that non-woven fabrics which are bonded by the process according to the invention withstand without any modification repeated domestic washing operations, e.g. in a normal domestic washing machine at 90° C. In contrast to the usual non-woven fabrics, thick layers of the non-woven fabrics according to the invention, during making up, can also be cut without the band cutters or guide rollers becoming soiled with binder, which can sometimes result in the blades being broken.

It is a particular advantage that with non-woven fabrics which are based on synthetic fibres, it is possible to dispense with the additon of conventional formaldehyde precondensates without the fastness level being disadvantageously influenced.

The parts and percentages indicated in the following examples are parts and percentages by weight, unless otherwise mentioned.

*Example 1*

Non-woven cellulose fabrics and non-woven polyamide fabrics were impregnated with binder solutions containing 400 g./l. of 45% aqueous emusion of a copolymer of

A

| | Parts |
|---|---|
| Ethyl acrylate | 90 |
| Methacrylamide | 5 |
| Methyl methacrylamidomethylene carbamate | 5 | and, for comparison, of

B

| | Parts |
|---|---|
| Ethyl acrylate | 90 |
| Methacrylamide | 5 |
| N-methylolmethacrylamide | 5 | by dipping and squeezing at (a) pH 4 (adjusted with ammonium chloride)
(b) pH 7 (adjusted with 10% sodium hydroxide solution)
(c) pH 9 (adjusted with 10% sodium hydroxide solution)

and dried at 80° C.

Specimens were extracted for one hour with boiling perchlorethylene and the loss in weight was determined. The following results were obtained:

| | Percent loss in weight for non-woven polyamide fabric | | | Percent loss in weight for non-woven cellulose farbic | | |
|---|---|---|---|---|---|---|
| pH value of the solution | 4 | 7 | 9 | 4 | 7 | 9 |
| Copolymer A | 1.2 | 1.0 | 1.0 | 0.8 | 1.0 | 0.9 |
| Copolymer B | 3.2 | 6.7 | 8.0 | 3.1 | 4.5 | 5.2 |

The non-woven fabric coated with the copolymer A has excellent elasticity and a soft handle and was practically unchanged after being washed 10 times in a domestic washing machine. Very thick layers of the non-woven fabric could also be cut without the cutters sticking.

*Example 2*

A non-woven cellulose fabric was impregnated as described in Example 1 at pH 7 with an aqueous emulsion of a copolymer of

| | Parts |
|---|---|
| Butyl acrylate | 87 |
| Methyl methacrylate | 5 |
| Methacrylamide | 3 |
| Ethyl methacrylamidomethylene carbamate | 5 | and, after drying at 75° C., (a) was not condensed
(b) was condensed for 5 minutes at 100° C.
(c) was condensed for 5 minutes at 120° C.
(d) was condensed for 5 minutes at 150° C.

After extracting the non-woven fabrics one hour with boiling perchlorethylene, the following results were obtained:

| | Percent loss of weight |
|---|---|
| (a) | 1.3 |
| (b) | 1.0 |
| (c) | 0.8 |
| (d) | 1.9 |

*Example 3*

A non-woven jute fabric was impregnated with the copolymer A of Example 1 at pH 4 and pH 7 in the manner described, dried at 70° C. and thereafter finally condensed.

(a) for 5 minutes at 80° C. and
(b) for 5 minutes at 120° C.

The following tensile strengths in kg./cm.² were obtained:

| | Condensed at pH 4 | Condensed at pH 7 |
|---|---|---|
| Experiment (a) | 42.5 | 97.5 |
| Experiment (b) | 34.0 | 55.7 |

*Example 4*

Following the process of Example 2, the following aqueous copolymer emulsions were used for impregnating a non-woven cellulose fabric at pH 7.

| Copolymer | 1 | 2 | 3 | 4 |
|---|---|---|---|---|
| Parts of butyl acrylate | 80 | 40 | 60 | |
| Parts of ethyl acrylate | | | | 70 |
| Parts of ethyl hexyl methacrylate | | 40 | 6.5 | 24 |
| Parts of acrylonitrile | 12 | 10 | | |
| Parts of vinyl chloride | | | 15 | |
| Parts of vinyl acetate | | | 15 | |
| Parts cyclohexyl methacrylamidomethylene carbamate | | | 3.5 | 6 |
| Parts of phenyl methacrylamidomethylene carbamate | 8 | 10 | | |

After drying at 75° C., elastic non-woven fabrics with exceptional resistance to solvents were obtained.

*Example 5*

One square metre of a needle-punched non-woven polyamide fabric of fibres with an average length of 60 mm., a thickness of 1.2 dne. and a weight per square metre of 450 g. was dipped for 10 minutes into a solution containing the following constituents:

1930 g. of a 35% aqueous emulsion of a copolymer of 77 parts of butyl acrylate, 10 parts of butadiene, 5 parts of styrene, 3 parts of methacrylamide and 5 parts of ethyl methacrylamidomethylene carbamate,
58 g. of a 50% aqueous solution of a melamineformaldehyde precondensate, and
1392 g. of water.

The impregnated non-woven fabric was squeezed out to a weight of 2700 g. It therefor econtained 2250 g. of the above solution, corresponding to 450 g. of polymer. It was dried at 60° C. in circulating warm air and pressed for 5 minutes at 165° C. and 50 atm. in a 1 mm. frame. The consolidated and cured non-woven fabric was washed in water, dried at 100° C. and buffed on both sides.

The elastic soft non-woven fabric obtained has a completely leather-like handle and the following properties:

Tensile strength (DIN 53,328) --- 246 kg./cm.²
Resistance to further tearing (DIN 53,329) -------------------- 42 kg./cm.
Flexometer test [Das Leder 8 (1957), page 190–198] -------- No visible damage after 100,000 folds.

We claim:
1. A process for producing non-woven fabrics from fibre webs which comprises contacting fibre webs with an aqueous copolymer emulsion obtained by copolymerizing:
 (a) 0.1 to 50% by weight, based on the total monomers, of a monomer of the formula

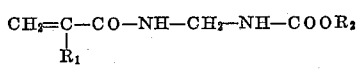

wherein $R_1$ is selected from the group consisting of hydrogen and methyl and $R_2$ is a member selected from the group consisting of alkyl having 1 to 6 carbon atoms, cycloalkyl having 5 to 7 carbon atoms, phenylalkyl having 1 to 3 carbon atoms in the alkyl moiety, phenyl and naphthyl,
 (b) at least 20% by weight, based on the total monomers, of at least one monomer with an elasticising action selected from the group consisting of conjugated 1,3-diolefins having 4 to 6 carbon atoms, esters of acrylic acid with an alcohol containing 1 to 20 carbon atoms and esters of methacrylic acid with an alcohol containing 4 to 20 carbon atoms, and
 (c) 0 to 79% by weight, based on the total monomers, of at least one further monomer capable of copolymerizing with monomers (a) and (b).
and drying said non-woven fabrics at a temperature between 50 and 150° C.

2. The process of claim 1 wherein said monomer (c) is selected from the group consisting of esters of methylacrylic acid with alcohol containing 1 to 3 carbon atoms, vinyl acetate, vinyl chloride, acrylonitrile, acrylamide, methacrylamide and styrene.

3. The process of claim 1 wherein $R_2$ is alkyl having 1 to 4 carbon atoms.

4. The process of claim 1 wherein from 1 to 15% by weight, based on the total monomers, of monomer (a) is employed.

5. The process of claim 1 wherein the aqueous copolymer emulsion is obtained by copolymerizing 90 parts by weight of ethyl acrylate, 5 parts by weight of methacrylamide and 5 parts by weight of methyl methacrylamidomethylene carbamate.

6. The process of claim 1 wherein the aqueous copolymer emulsion is obtained by copolymerizing 87 parts by weight of butyl acrylate, 5 parts by weight of methyl methacrylate, 3 parts by weight of methacrylamide and 5 parts by weight of ethyl methacrylamidomethylene carbamate.

7. The process of claim 1 wherein the aqueous copolymer emulsion is obtained by copolymerizing 1930 g. of a 35% aqueous emulsion of a coplymer of 77 parts by weight of butyl acrylate, 10 parts by weight of butadiene, 5 parts by weight of styrene, 3 parts by weight of methacrylamide and 5 parts by weight of ethyl methacrylamidomethylene carbamate.

8. A composition of matter comprising a non-woven cellulose fabric bonded with a cross-linked copolymer produced from 90 parts by weight of ethyl acrylate, 5 parts by weight of methacrylamide and 5 parts by weight of methyl methacrylamidomethylene carbamate.

9. A composition of matter comprising a non-woven cellulose fabric bonded with a cross-linked copolymer produced from 87 parts by weight of butyl acrylate, 5 parts by weight of methyl methacrylate, 3 parts by weight of methacrylamide and 5 parts by weight of ethyl methacrylamidomethylene carbamate.

10. A composition of matter comprising a non-woven fabric bonded with a cross-linked copolymer produced from:
 (a) 0.1 to 50% by weight, based on the total monomers, of a monomer of the formula

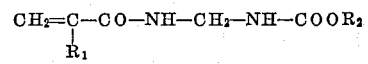

wherein $R_1$ is selected from the group consisting of hydrogen and methyl and $R_2$ is a member selected from the group consisting of alkyl having 1 to 6 carbon atoms, cycloalkyl having 5 to 7 carbon atoms, phenylalkyl having 1 to 3 carbon atoms in the alkyl moiety, phenyl and naphthyl,
 (b) at least 20% by weight, based on the total monomers, of at least one monomer with an elasticising action selected from the group consisting of conjugated 1,3-diolefins having 4 to 6 carbon atoms, esters of acrylic acid with an alcohol containing 1 to 20 carbon atoms and esters of methacrylic acid with an alcohol containing 4 to 20 carbon atoms, and
 (c) 0 to 79% by weight, based on the total monomers, of at least one further monomer capable of copolymerizing with monomers (a) and (b).

11. The composition of matter of claim 10 wherein from 1 to 15% by weight, based on the total monomers, of monomer (a) is employed.

12. The composition of matter of claim 10 wherein $R_2$ is alkyl having from 1 to 4 carbon atoms.

References Cited by the Examiner
UNITED STATES PATENTS 2,984,588   5/1961   Graulich et al. ------- 117—161
3,026,217   3/1962   Hechtman et al. --- 117—161 X WILLIAM D. MARTIN, *Primary Examiner.*

H. W. MYLIUS, *Assistant Examiner.*